A. CARLSON.
CORN LOADER.
APPLICATION FILED NOV. 22, 1915.
1,190,105.
Patented July 4, 1916.
2 SHEETS—SHEET 1.
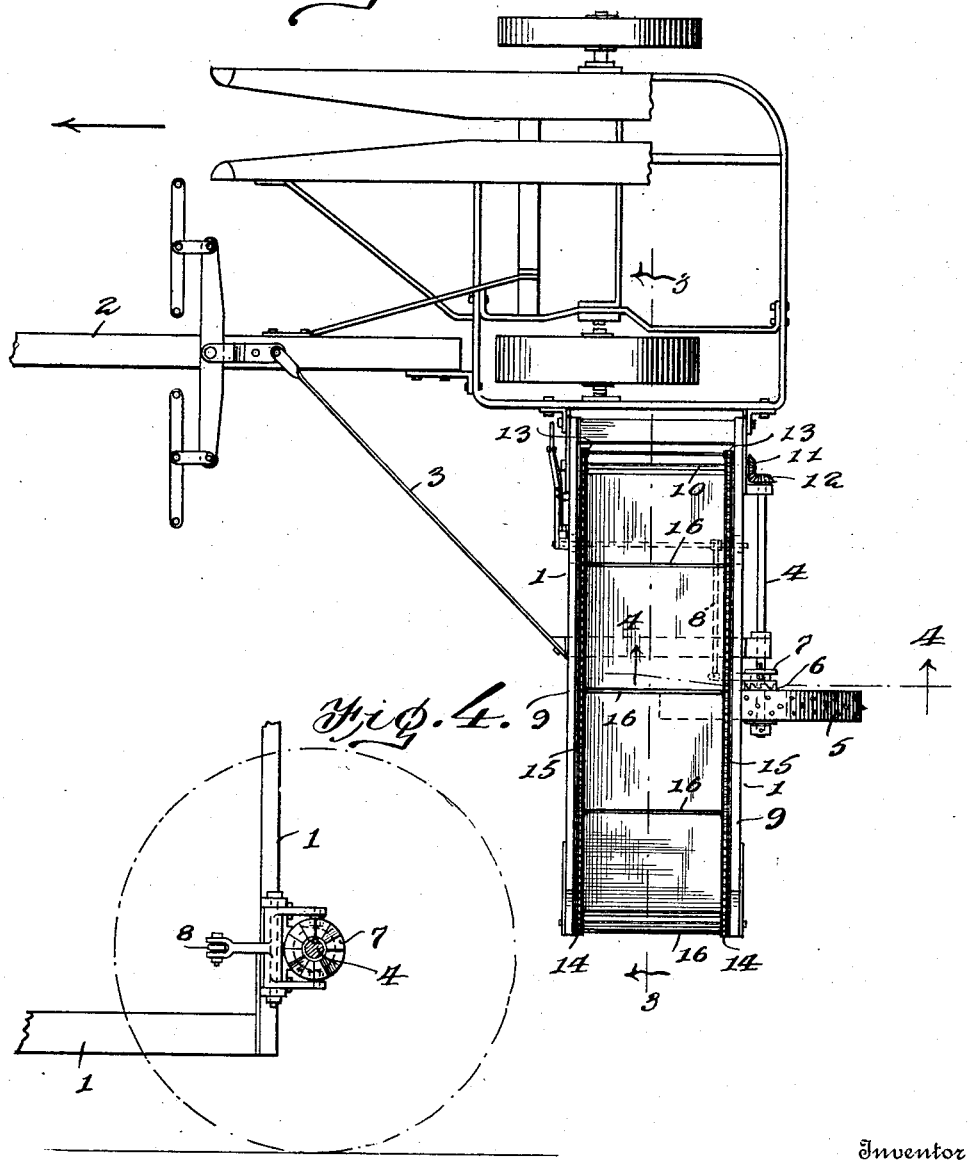
Witnesses
H. H. Lybrand
J. Wilcox
Inventor
August Carlson
By Victor J. Evans
Attorney A. CARLSON.
CORN LOADER.
APPLICATION FILED NOV. 22, 1915.
1,190,105.
Patented July 4, 1916.
2 SHEETS—SHEET 2.
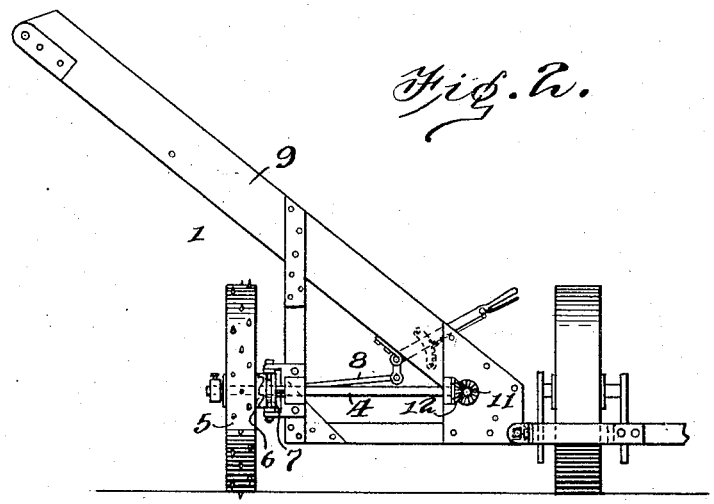
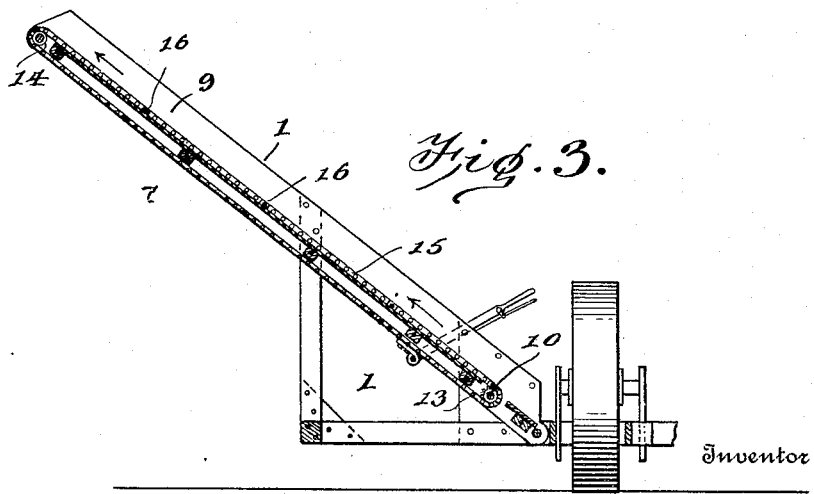
Witnesses
H. H. Lybrand
L. Wilcox
Inventor
August Carlson
By Victor J. Evans
Attorney

UNITED STATES PATENT OFFICE.

AUGUST CARLSON, OF RICHARDSON, ILLINOIS.

CORN-LOADER.

1,190,105.   Specification of Letters Patent.   Patented July 4, 1916.

Application filed November 22, 1915. Serial No. 62,862.

*To all whom it may concern:*

Be it known that I, AUGUST CARLSON, a citizen of the United States, residing at Richardson, in the county of Kane and State of Illinois, have invented new and useful Improvements in Corn-Loaders, of which the following is a specification.

This invention relates to loader adapted to be attached to harvesting machines and it consists in the novel features hereinafter described and claimed.

While the present invention is shown in the form of an attachment especially adapted for loading or transferring corn from a harvesting machine to a wagon body, it is to be understood that the same general form or type of attachment may be used for loading or transferring other commodities.

An object of the invention is to provide an attachment of the character indicated adapted to travel at the side of a harvesting machine and provided with means for elevating and transferring the corn from the harvester to a wagon body which may be drawn beyond the delivery edge of the attachment.

With the above object in view the attachment comprises a wheel mounted frame having an elevator mounted for movement thereon, with means for operating the elevator from the wheel which supports the attachment.

In the accompanying drawings: Figure 1 is a top plan view of the attachment indicating the same connected with part of a harvester. Fig. 2 is a rear end elevation of the same. Fig. 3 is a longitudinal sectional view of the same cut on the line 3—3 of Fig. 1. Fig. 4 is a detail sectional view of parts of the same cut on the line 4—4 of Fig. 1.

The attachment comprises a frame 1 having a tongue 2 connected with the forward portion thereof, a brace 3 of any suitable form is connected with the tongue and the forward portion of the frame 1. A shaft 4 is journaled at the lower rear portion of the frame and a ground wheel 5 is journaled upon the said shaft 4. The wheel 5 is provided with a clutch hub 6 and a clutch member 7 is slidably mounted upon the shaft 4 but is constrained to rotate in unison therewith. A rod 8 is connected with the clutch member 7 and extends along the frame 1 to within reach of the operator who is directing the harvesting machine. By shifting the rod 8 the clutch member 7 may be brought into engagement with the clutch hub 6 of the traction wheel whereby the shaft 4 is rotated in unison with the said traction wheel. A conveyer casing 9 is mounted in an inclined position upon the frame 1 and a shaft 10 is journaled for rotation at the lower end thereof. A beveled pinion 11 is mounted upon the shaft 10 and meshes with a pinion 12 fixed to the shaft 4. Sprocket wheels 13 are mounted upon the shaft 10 between the sides of the casing 9 and pulleys 14 are journaled at the upper end of the casing 9 in alinement with the sprocket wheels 13. Chains 15 are trained around the sprocket wheels 13 and pulleys 14 and the chains at the opposite sides of the casing 9 are connected together by cross slats 16 adapted to move along the bottom of the casing 9.

In operation the attachment is moved over a field with the harvesting machine and the material from the harvester is deposited in the lower portion of the casing 9. The said material is engaged by the slats and chains and is carried up along the said casing and delivered at the upper outer end thereof to a wagon body or other receptacle provided for its reception. As the wheel 5 moves over the ground it is rotated by contact therewith and when the clutch member 7 is in engagement with the clutch hub 6 the shaft 4 is rotated and through the intermeshing pinions 11 and 12 rotary movement is transmitted from the shaft 4 to the shaft 10. Consequently the sprocket wheels 13 upon the shaft 10 are rotated and the said sprocket wheels in turn move the chains 15 along the casing 9 whereby the slats are moved along the said casing in a manner as hereinbefore described.

From the above description taken in conjunction with the accompanying drawing it will be seen that a loader attachment of simple and durable structure is provided and that the same will efficiently operate in elevating and discharging material which is received from a machine to which the attachment is applied.

Having described the invention what is claimed is:

A device of the class described, a combination, a rectangular frame, wheels upon which said frame is mounted, a pair of angle iron supports secured to one side of said frame, a pair of L-shaped standards secured at their inner ends upon said angle iron supports, a conveyer casing secured at an upward inclination and secured respectively to the opposite part of said L-shaped standard, a wheel disposed in a plane at right angles to said conveyer casing, a clutch member, a shaft secured concentrically of said wheel, side supports carried by said L-shaped standard and serving as a mounting for said shaft and as a means for supporting said casing upon said wheel, an endless carrier moving between the sides of said casing, being controlled by said last named wheel for operating said endless carrier and an actuator for said last named means disposed in proximity to the rectangular frame.

In testimony whereof I affix my signature in presence of two witnesses.

AUGUST CARLSON.

Witnesses:
CARL LINDEN,
J. H. MARSHALL.

Copies of this patent may be obtained for five cents each, by addressing the "Commissioner of Patents, Washington, D. C."